(12) United States Patent
Derby et al.

(10) Patent No.: US 6,198,817 B1
(45) Date of Patent: Mar. 6, 2001

(54) COMMUNICATION INTERFACE HAVING COMBINED SHAPING OF RECEIVE RESPONSE AND SYNTHESIZED MATCHING TERMINATING IMPEDANCES FOR DIFFERENT FREQUENCY BANDS AND A DESIGN METHOD THEREFOR

(75) Inventors: Jeffrey Haskell Derby, Chapel Hill; David Ross Thomas, Apex, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/012,311

(22) Filed: Jan. 23, 1998

(51) Int. Cl.$^7$ .................................................. H04M 1/60
(52) U.S. Cl. ........................ 379/394; 379/398; 379/411
(58) Field of Search ................................... 379/394, 398, 379/399, 403, 411

(56) References Cited

U.S. PATENT DOCUMENTS

| | | | |
|---|---|---|---|
| 3,829,626 | * 8/1974 | Irwin et al. | 379/398 |
| 4,004,102 | * 1/1977 | Ott | 379/398 |
| 4,351,060 | 9/1982 | Treiber | 375/12 |
| 4,359,609 | 11/1982 | Apfel | 179/16 F |
| 4,377,730 | * 3/1983 | Gay et al. | 379/402 |
| 4,381,561 | 4/1983 | Treiber | 370/24 |
| 4,524,332 | * 6/1985 | Gay | 330/294 |
| 4,677,667 | * 6/1987 | Burns | 379/398 |
| 4,796,295 | * 1/1989 | Gay et al. | 379/392 |
| 4,894,864 | 1/1990 | Cook | 379/398 |
| 4,961,219 | 10/1990 | Patel | 379/398 |
| 5,185,789 | * 2/1993 | Hanon et al. | 379/395 |
| 5,187,742 | * 2/1993 | Moran, III et al. | 379/403 |
| 5,459,440 | * 10/1995 | Claridge et al. | 333/17.3 |
| 5,500,894 | 3/1996 | Hershbarger | 379/399 |
| 5,598,467 | 1/1997 | Bremner et al. | 379/398 |
| 5,608,795 | * 3/1997 | Gay | 379/399 |
| 5,867,573 | * 2/1999 | Wittman | 379/387 |
| 5,953,409 | * 9/1999 | Carlsen | 379/394 |

* cited by examiner

Primary Examiner—David R. Hudspeth
Assistant Examiner—Daniel Abebe
(74) Attorney, Agent, or Firm—John D. Flynn; Daniel E. McConnell

(57) ABSTRACT

A communication interface and a design method therefor simultaneously shape a synthesized terminating impedance matching different frequency bands on different connecting communication circuits and a receive path response to prevent frequency roll-off. In some cases, for example based on specified network requirements in a particular country, the terminating impedance presented by the interface must have different frequency characteristics for received signals in different bands of frequencies. A transconductance amplifier and feedback loop provide the terminating impedance for signals received from the communication circuit and serve as a source impedance for signals transmitted by the interface to the telephone line. Signals with different frequencies will generally be received from the telephone line. These different characteristics are realized using different filter networks in the feedback loop. Each network provides a matching terminating impedance to the communication circuit according to the frequency band applied to the circuit. The network shapes the synthesized impedance based upon the relation $Z = 1/G_m H$ where $Z$=the terminating impedance; $G_m$ is the transconductance of the amplifier and $H$ is the transfer function of the feedback network. For multiple frequencies on the telephone line, multiple networks are included in the feedback loop. Each network is designed to match the impedance requirements of a frequency band without affecting the terminating impedance and frequency band of the other frequency bands. A receive filter circuit is coupled to the feedback loop and in combination with the filter networks in the feedback loop prevent frequency roll-off of received frequencies.

17 Claims, 5 Drawing Sheets

COMMUNICATION INTERFACE HAVING COMBINED SHAPING OF RECEIVE RESPONSE AND SYNTHESIZED MATCHING TERMINATING IMPEDANCES FOR DIFFERENT FREQUENCY BANDS AND A DESIGN METHOD THEREFOR

RELATED APPLICATION

Co-pending application entitled "A Communication Interface Having Synthesized Matching Impedances For Different Frequency Bands And A Design Method Therefor", Ser. No. 09/013,363, filed Jan. 23, 1998, and assigned to the same assignee as that of the present invention.

BACKGROUND OF THE INVENTION

1. Field of Invention

This invention relates to communication interfaces and design methods therefor. More particularly, the invention relates to a telephone line interface which simultaneously shapes received signals to reject unwanted signals and synthesized matching impedances for different frequency bands on a connecting telephone line and a design method therefor.

2. Description of Prior Art

Communication interfaces, more particularly, telephone line interface circuits, are required to provide a particular set of functions associated with connection to a telephone cable pair carrying an analog/digital telephone signal. This set of functions includes the following:

1. Termination of the telephone cable pair with a specified impedance. The impedance is generally different in different countries. In some cases, the impedance is complex with a magnitude that decreases with increasing frequency. In addition, some countries require that the terminating impedance be greater in magnitude than some specified value at one more frequencies above the voice band.

2. Maintenance of an appropriate receive frequency response. Generally, the objective is to maintain a frequency response as flat as possible, i.e., with as little variation in frequency as possible.

3. Removal of certain network-generated signals which are used in telephone systems of some countries. A major example is the so-called metering-tone, a signal above the voice frequency band (typically a 12 kHz. or 16 kHz.) that must be filtered out in the receive signal path.

Classically, telephone line interface circuits have been implemented with a transformer in the signal path. In such circuits, metering-tone signals are commonly removed using a passive LC filter between the transformer and the telephone line. The LC filter simultaneously provides a high impedance to the telephone line at the metering-tone frequency. In interface circuits of this type, the terminating impedance in the voice band may be realized in a number of ways. However, when the terminating impedance must be complex, there is an unavoidable roll-off introduced in the receive response. That is the magnitude of the receive response is not flat but decreases with increasing frequency. The roll-off must be compensated elsewhere in the receive path using extra circuitry.

Recently, there has been growing interest in telephone line interface circuits that are physically small and that employ a single hardware design that meets requirements of all countries, either statically or by reconfiguration of the hardware under control of software. Such circuits cannot employ transformers in the signal path in the usual way, because transformers are physically large (relatively speaking) and interfere with the ability to program certain of the telephone line interface circuit characteristics. Such circuits cannot employ LC metering-tone filters because the inductors in these filters are physically large; different sets of filter components are required for different metering-tone frequencies; and the ability to reconfigure these filters accordingly, is extremely difficult and costly to realize. Finally, such circuits suffer from the problem of roll-off of the receive response with complex-impedance termination and require additional circuitry to compensate for roll-off. Recently, active filters using transconductance amplifiers with feedback have been used to synthesize terminating impedances and may be programmed to serve a wide variety of terminating conditions. The application of such active filters to the problem of receive signal roll-off would advance the state of the art.

Prior art related to terminating impedances for telephone interface circuits using a transconductance amplifier with feedback includes the following:

U.S. Pat. No. 5,500,894 issued Mar. 19, 1996, discloses a telephone line interface circuit with AC and DC transconductance loops for providing selectable impedances to a cable pair. The '894 patent does not disclose a cascade of sub-filter networks which simultaneously shapes a receive path response to prevent roll-off from unwanted signal components and matching terminating impedances for different frequency bands on the cable pair.

U.S. Pat. No. 4,894,864 issued Jan. 16, 1990, discloses a transconductance loop including a filter network for synthesing a terminating impedance into real and imaginary components for a single frequency band and does not simultaneously shape a receive path response to prevent roll-off.

U.S. Pat. No. 4,351,060 issued Sep. 21, 1982, discloses a transconductance feedback loop including a filter for synthesizing a matching impedance for a single frequency on a connecting telephone circuit, but which does not simultaneously shape receive path response to prevent roll-off.

U.S. Pat. No. 4,381,561 issued Apr. 26, 1983, discloses impedance matching for an interface circuit using a digital filter and D/A converter in a negative feedback loop to match a full duplex analog telephone line to a digital switching system. The '561 patent does not simultaneously shape (a) the synthesized matching impedance and (b) a receive path response to prevent roll-off.

U.S. Pat. No. 4,359,609 issued Nov. 16, 1982, discloses an interface circuit having a feedback loop, either current or voltage controlled, by which the circuit impedance can be easily set to match a telephone circuit. The '609 patent does not disclose simultaneously shaping (a) synthesized matching impedances to different frequency bands and (b) a receive path response to prevent roll off on a connecting cable pair.

U.S. Pat. No. 4,961,219 issued Oct. 2, 1990, discloses synthesing an impedance across a telephone line by detecting a voltage difference across the telephone line and using an RC circuit to develop a pair of impedance output signals matching the impedance of the telephone line circuit. The '219 patent does not disclose a transconductance loop and filter for simultaneously shaping (a) synthesizing matching impedance to that of different telephone line circuits and (b) a receive path response to prevent roll off.

U.S. Pat. No. 5,598,467 issued Jan. 28, 1977, and filed Dec. 9, 1994, discloses shaping of the receive and transmit frequency responses in addition to the termination impedance. However, the '467 patent does not disclose simultaneously shaping (a) synthesized matching impedances for different frequency bands and (b) a receive path response to prevent roll-off.

None of the prior art, alone or in combination, disclose or suggest a communication interface in which a receive signal from a telephone line circuit is taken from a point within a feedback loop for transconductance amplifier to control the shape of the receive signal to prevent roll-off while the frequency response of the terminating impedance is shaped to match the transmission impedance of a connecting telephone line circuit carrying different frequency bands.

SUMMARY OF THE INVENTION

An object of the invention is a communication interface and a design method which simultaneously shapes a receive signal to prevent frequency roll-off and synthesized impedances matching different frequency bands on a connecting telephone line circuit.

Another object is a communication interface and a design method using multiple filter networks in a transconductance amplifier loop to simultaneously shape a receive signal to minimize frequency roll-off and synthesized impedances matching different frequency bands on a connecting telephone line circuit.

Another object is a communication interface and a design method for providing a complex termination impedance without roll-off of a receive signal on a connecting telephone line circuit.

Another object is a telephone line interface circuit and a design method for simultaneously shaping a receive signal and synthesized impedances matching different frequency bands on a connecting telephone line circuit using multiple filter networks in a transconductance amplifier feedback loop.

Another object is a telephone line interface circuit and a design method for a transconductance amplifier feedback loop including multiple filter networks for shaping synthesized impedances matching different frequency bands and a connecting filter network for shaping a receive signal to minimize roll-off on a connecting telephone line circuit.

These and other objects, features and advantages are achieved in a telephone interface circuit having combined shaping of "receive response" and "terminating impedance" for (i) terminating a telephone cable pair with a specified impedance which may be different for different telephone systems—in some cases, a complex impedance with a magnitude that decreases with frequency; (ii) maintaining a flat frequency response for receive signals; and (iii) removing certain undesired network-generated signals, e.g., so-called metering-tones. A transconductance amplifier is coupled to a telephone cable pair at a first node. A feedback loop is connected at one end to the first node and at the other end to a summing node. The feedback loop includes a first and a second filter network for shaping a synthesized impedance which may be a complex impedance for the interface circuit matching the impedance of the cable pair. A receive path is coupled to the feedback loop, typically but not exclusively, between the first and second filters. The receive path includes a receive amplifier and may include a third filter to compensate for roll-off in the receive frequency due to the complex terminating impedance. The first filter provides impedance shaping that is required in common for both the receive path and the transconductance feedback, for example, to achieve a higher impedance level required at a metering-tone frequency and attenuation in the receive path at the metering-tone frequency. The second filter provides unique impedance shaping for the transconductance feedback. The third filter provides additional rejection of metering-tones and unwanted signals above the voice band whereby simultaneous impedance shaping occurs while shaping the receive frequencies to exclude unwanted metering-tones and other signals.

DESCRIPTION OF DRAWING

The invention will be further understood from a following detailed description of a preferred embodiment taken in conjunction with an appended drawing, in which.

DESCRIPTION OF PREFERRED EMBODIMENT

Figure 1:
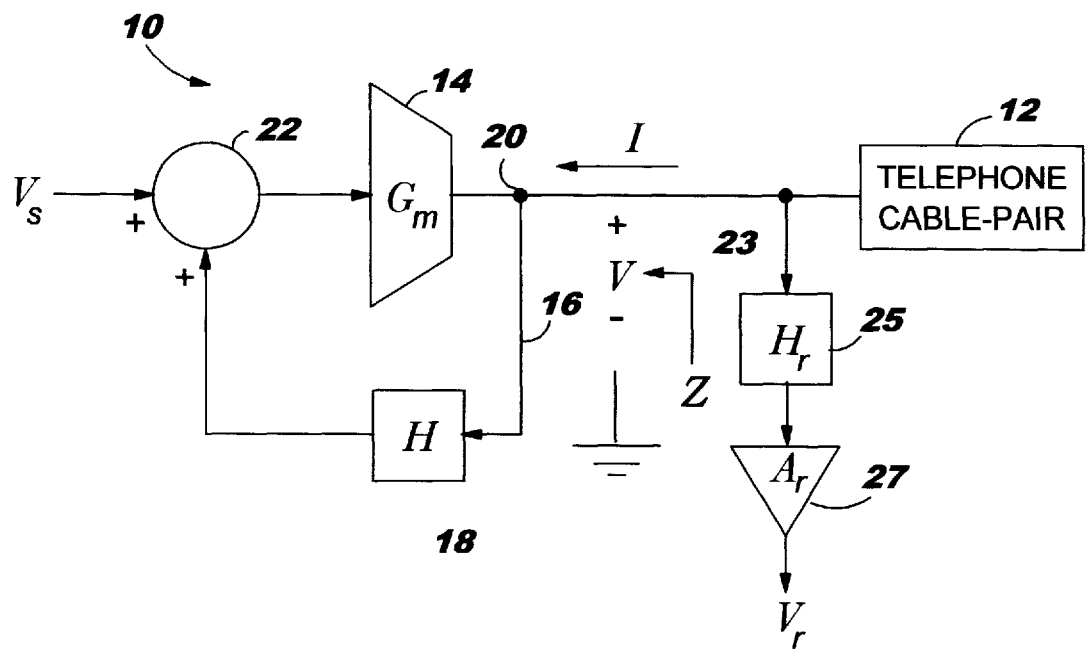
FIG. 1 is a prior art telephone line interface circuit including a transconductance feedback amplifier providing terminating impedances to a telephone cable pair and a receive circuit for processing a voice or data signal on the telephone cable pair.

In FIG. 1, a prior art transconductance driver 10 is connected to a telephone cable pair 12 and provides a terminating impedance Z, looking toward the driver for a telephone cable pair 12. The driver 10 includes a transconductance amplifier 14 and a feedback loop 16 connected between an output node 20 and an input node 22. The feedback loop 16 includes a filter network 18 having a transfer impedance H. A transconductance amplifier is described in the text "Circuits and Filters Handbook", edited by W. Chin, published by CRC Press, Boca Raton, Fla., 1995, Section 11 (ISBN 0-8493-8341-2). Such amplifiers provide an output current I (with the positive direction of the current I flowing into the amplifier 14) equal to $G_m$ (the amplifier gain)$\times V_i$ (the amplifier input voltage), the latter being $V_i$, the sum of the feedback voltage and a signal source voltage $V_s$ at the input node 22. The driver 10 provides a synthesized impedance Z for the cable pair in the receive direction. The impedance Z also serves as the source impedance in the transmit direction to the cable pair. The filter network 18 shapes the synthesized impedance Z. It can be shown that the synthesized impedance for such transconductance amplifiers with feedback can be defined in an Equation 1, as follows:

Z=1/$G_m$H (under the assumption that the input transfer impedance H of the network 18 is much higher than the load or transmission impedance presented by the cable pair), and where:

$G_m$ is the gain of the amplifier 12; and

H is the impedance of the network 18.

The transfer function H is designed such that the country terminating impedance requirements are met by the synthesized terminating impedance Z. A receive signal circuit 23 is connected to the cable pair 12. The circuit 23 includes a filter network 25 having a transfer impedance $H_r$ and a receive amplifier ($A_r$) 27. The filter network 25 compensates for the effects of Z, the terminating impedance being complex, and filters out the metering-tone in the received signal.

Figure 2A:
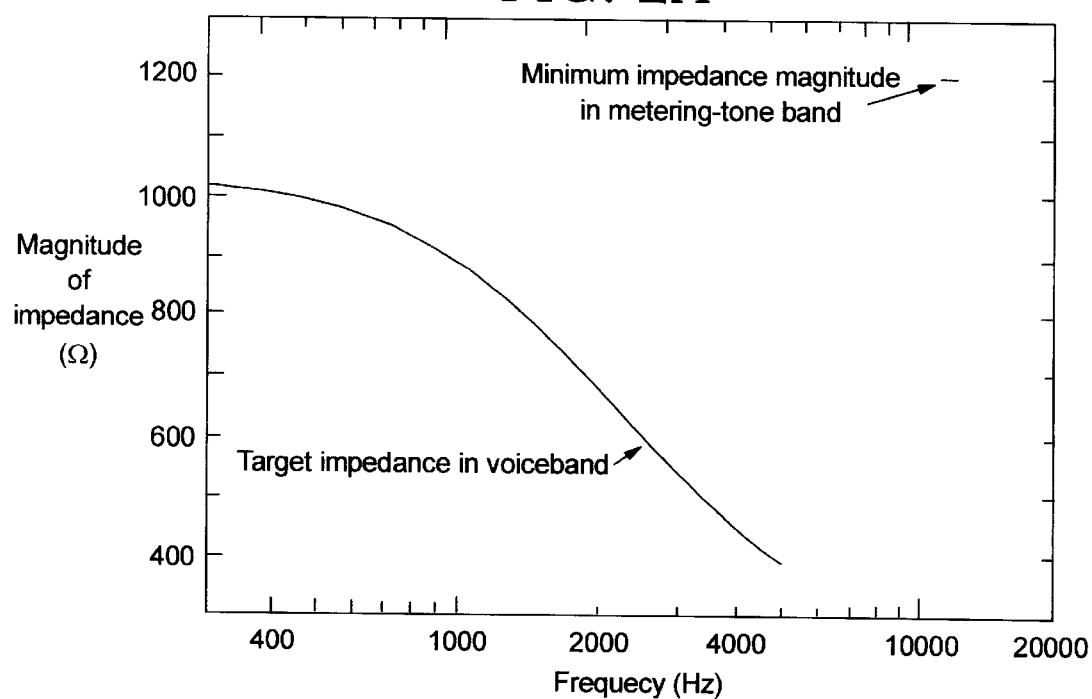
FIG. 2A is a graph of an impedance requirement vs. frequency in a country for the telephone line interface circuit of FIG. 1 carrying different frequency bands on the telephone cable pair.

In FIG. 2A, an example of terminating impedance requirements is shown for different frequency bands. One terminating impedance requirement is in the voice band below 5 kHz and a second frequency between 11.8 kHz and 12.2 kHz. At the upper end of the voice band the terminating impedance must be relatively low (about 300 ohms and decreasing with frequency) while in the metering-tone band the terminating impedance must be significantly higher (greater than 1200 ohms). Since an impedance z synthesized using a transconductance loop is inversely proportional to the loop transfer function (see Equation 1), the magnitude of H must increase with frequency in the voice band and then drop by at least a factor of 4 between 5 kHz and 12 kH. Designing a transfer function to meet these requirements would be overly complicated and not easily reconfigurable to meet a different set of impedance requirements in other countries. Further to provide adequate rejection of the metering-tone in the receive signal path, the receive path shaping network 25 must introduce high attenuation in the metering tone band. Meeting this requirement while maintaining essentially flat receive response in the voice band generally forces the filter network 25 to be a relatively complicated, high order filter.

However, there is a relationship between the requirements on impedance shaping network 18 and the requirements on the receive path shaping network 23, as follows. To provide rejection on the metering-tone signal in the receive path 23, the filter network 25 must have a very small value at the metering-tone frequency, in fact, a much smaller value than it has in the voice band. To provide a sufficiently high value of terminating impedance Z at the metering-tone frequency, the filter network 18 must have a very small value at the metering-tone frequency, in fact, a much smaller value than it has in the voice band. In the event Z is a complex impedance whose magnitude decreases with frequency, the magnitude of the filter network 18 must increase with frequency. To compensate for the roll-off in the receive response due to the complex impedance termination, the magnitude of filter network 25 must increase with frequency. In other words, there are aspects that appear to be common to both the impedance shaping network 18 and the receive path shaping network 25.

Figure 3A:
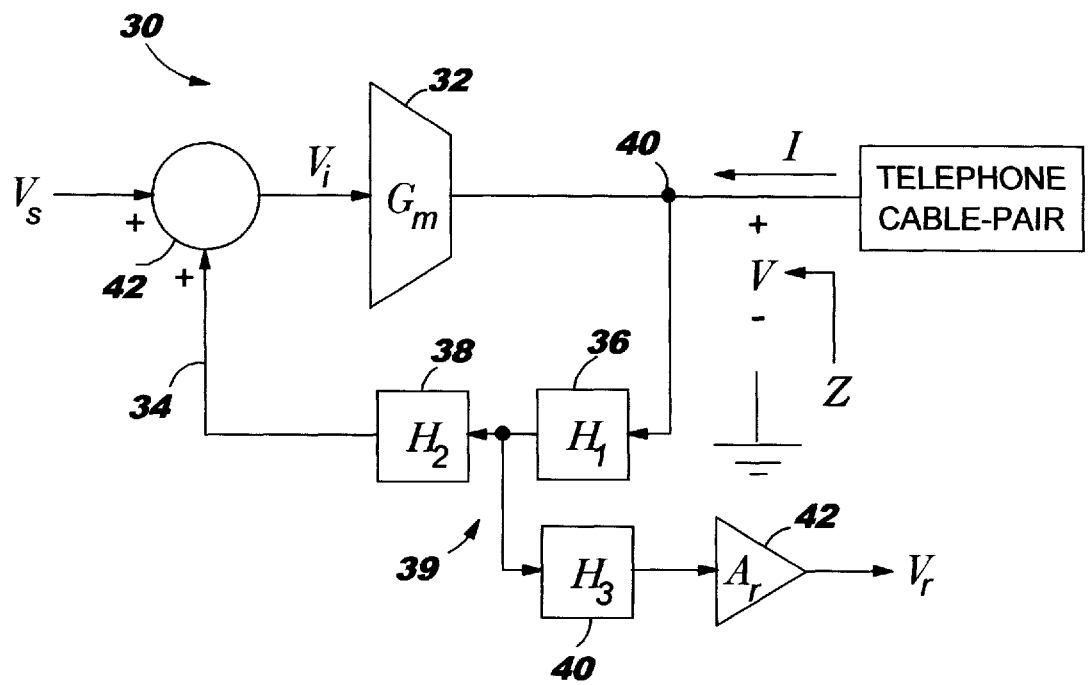
FIG. 3A is a circuit diagram for a telephone line circuit which provides a matching terminating impedance for different frequency bands and a receive signal without roll-off, the circuit incorporating the principles of the present invention.

In FIG. 3A the present invention takes advantage of the foregoing common aspect and solves the problem described in connection with FIGS. 1 and 2A. In FIG. 3A, a transconductance driver 30 provides a terminating impedance for the cable pair 12. The driver includes a transconductance amplifier 32 and a feedback loop 34 including cascaded sub-filter networks 36 and 38 having transfer impedance $H_1$ and $H_2$, respectively. The feedback loop is connected to a node 40 at the output of the amplifier 32 and to a node 42 at the input of the amplifier 32. The node 42 also receives a signal in the form of a voltage $V_s$ which in combination with the feedback voltage provides $V_i$ as an input voltage to amplifier 32. The sub-filter networks 36 and 38 are designed to meet one of the frequency band requirements described in connection with FIG. 2. A receive signal circuit 39 is connected to the feedback loop 34. Typically, but not exclusively, the receive signal circuit 39 is connected to the midpoint between filters 36 and 38. Alternatively, the receive signal circuit may be connected at the output of filter network 38, in which case the entire impedance shaping network appears in the receive signal path. It may also be appropriate for there to be more than two independent sub-networks in the impedance shaping path, in which case the receive circuit 39 may be connected between the second and third sub-networks, etc. Finally it may be that there is no additional shaping needed solely in the receive signal path, so that filter network 40 is not needed and the receive signal circuit maybe connected directly to the input of the receive amplifier 42. The appropriate alternative for any given application would be determined as will be described hereinafter in FIG. 5 for the design method. The receive signal circuit includes a filter 40 having a transfer function H3 and a receive amplifier 42 which provides an output signal $V_r$.

Figure 3B:
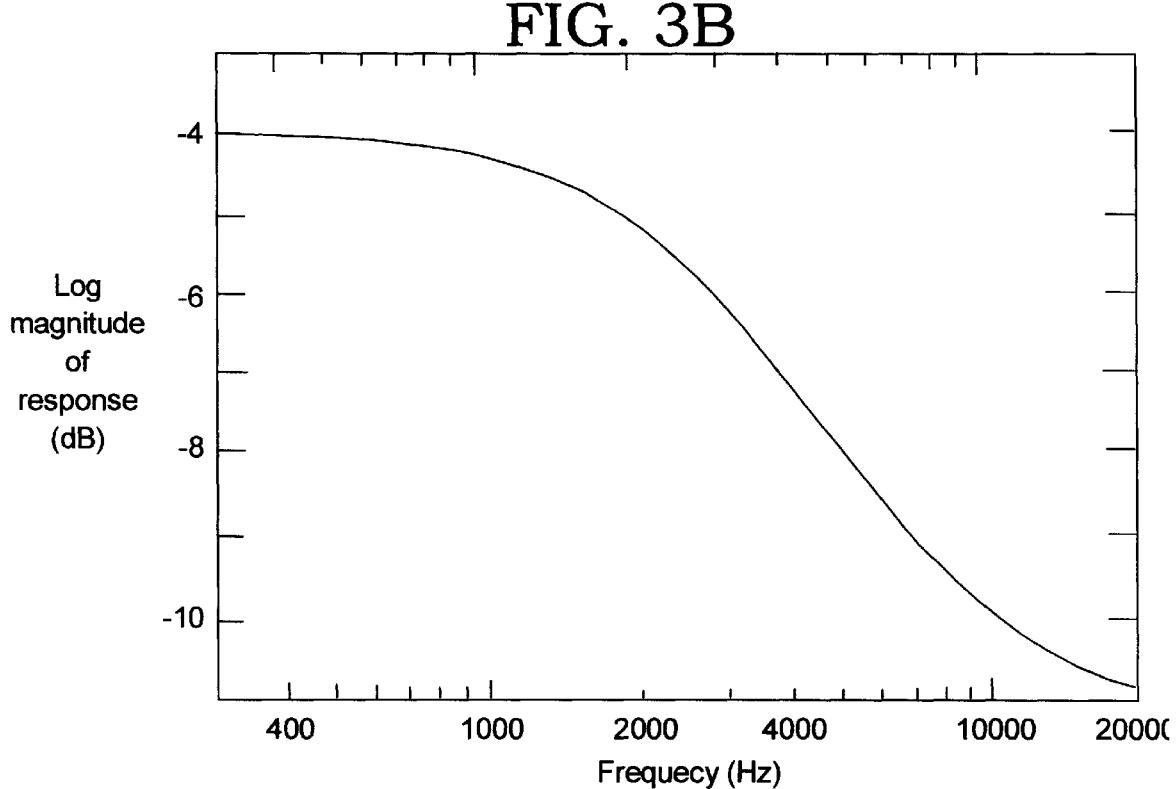
FIG. 3B is a graph of voice-band frequency response (amplitude vs. frequency) for a receive signal terminated in a network H3 for a complex termination impedance in the circuit of FIG. 3A.
Figure 3C:
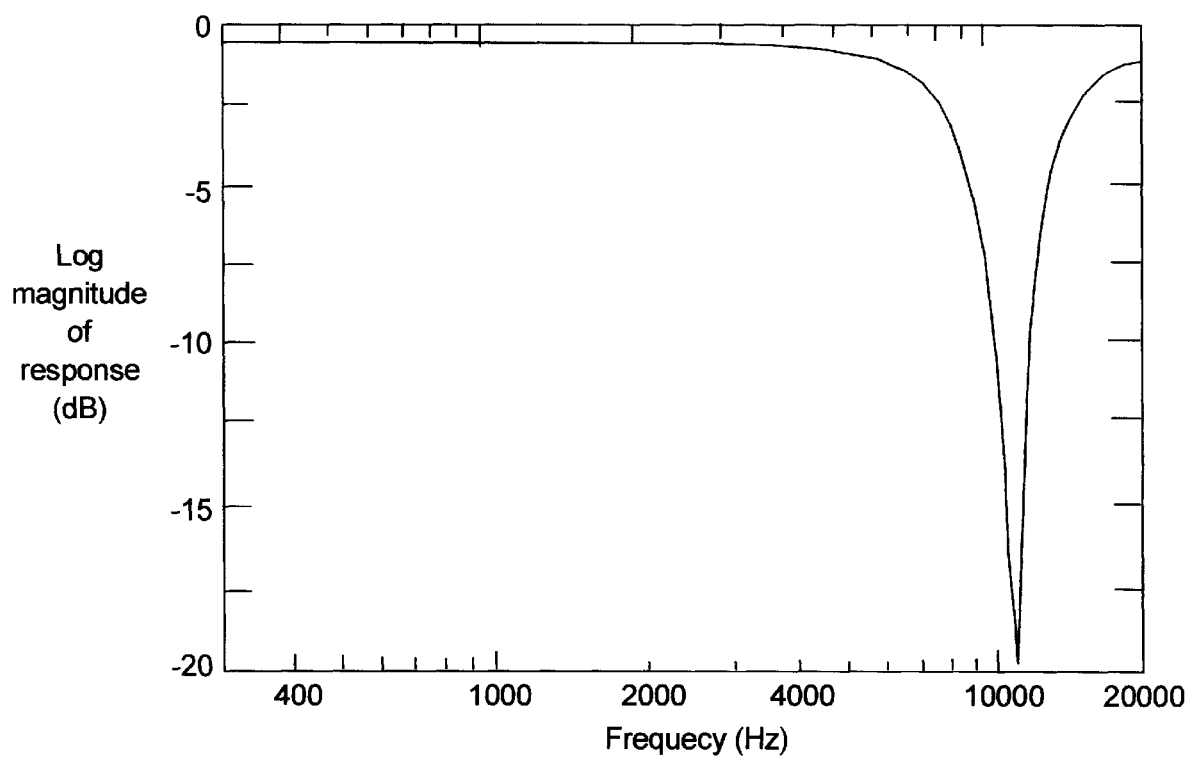
FIG. 3C is a graph of metering-tone frequency response (amplitude vs. frequency) including a notch for a receive signal having roll-off due to a complex terminating impedance for the telephone line interface circuit of FIG. 3A.

Each filter network 36, 38 and 40 can be optimized to one of the required frequency bands. For example, filter network 40 can be designed to compensate for the roll-off of the voice-band receive frequency response resulting from a complex termination impedance; an example of such a response is shown in FIG. 3B. Likewise, filter network 38 can be designed to meet the minimum impedance requirement in the metering-tone band while remaining flat in the voice band as shown in FIG. 3C.

As described in the European Telecommunications Standards Institute(ETSI, Section 4.1.2(CH), March 1996), it can be shown using a first order lead-lag network that the voice band can be approximated by a LaPlace transform H(s) described by Equation 2, as follows:

$$H_1(s) = H_{10} \frac{\left[1+\left(\frac{s}{\omega_z}\right)\right]}{\left[1+\left(\frac{s}{\omega_p}\right)\right]}$$

where:

$H_1(s)$=the LaPlace Transform H1 defining the terminating impedance for the voice frequency band;

$\omega_p$=pole frequency for the network; and $\omega_z$=zero frequency for the filter network.

Figure 2B:
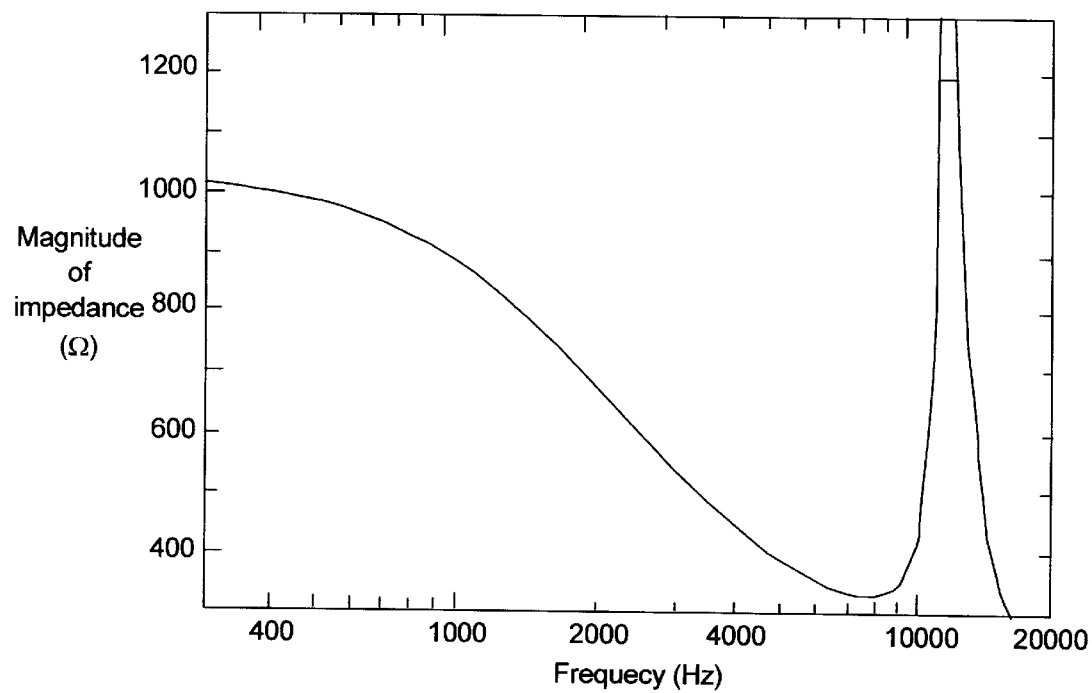
FIG. 2B is a graph of frequency in hertz (Hz) vs. synthesized impedance in ohms ($\Omega$) for a filter in one country providing a notch response.

To meet the requirement for the metering-tone band, the filter network 38 must provide an approximately constant magnitude and phase through the voice band and then have the magnitude decrease sharply between 5 kHz. and 12 kHz. which is essentially a notch response for the higher order frequencies, as shown in FIG. 2B.

A terminating impedance to meet a metering tone requirement must have approximately constant magnitude and phase through the voice band and thereafter the magnitude decreases sharply between 5 kHz and 12 kHz. This can be obtained with a notch response for the higher frequencies. As described in the text "Design Of Analog Filters" by Schaumann, Ghausi and Laker, published by Prentice-Hall, Englewood Cliffs, N.J., a notch response can be approximated by a LaPlace Transform H(s) described by Equation 3, as follows:

$$H_2(s) = H_{20} \frac{1 + \left(\frac{1}{Q_U}\right)\left(\frac{s}{\omega_0}\right) + \left(\frac{s}{\omega_0}\right)^2}{1 + \left(\frac{1}{Q_L}\right)\left(\frac{s}{\omega_0}\right) + \left(\frac{s}{\omega_0}\right)^2}$$

where:

$\omega_0$=the center frequency of the notch response that the metering-tone frequency;

$Q_U$=unloaded Q of the notch, which is related to the ratio of the maximum energy stored to the energy lost in the filter $H_2$; and $Q_L$=loaded Q of the notch, which is related to the ratio of the maximum energy stored to the energy lost in the filter $H_2$.

The overall gain constant of H which is the product of $H_{10} \cdot H_{20}$ must be adjusted at the end of the process to take into account the transconductance $G_m$ (assumed to be independent of frequency) in meeting the overall terminating impedance requirements for the different frequency bands.

The filter 40 provides additional rejection of the metering-tone signal in the receive path and compensates for roll-off of the receive response due to a complex terminating impedance. Because of the notch response of the filter 36 which is shared between the transconductance loop and the receive path, the requirements on the filter 40 associated with metering-tone rejection are relaxed; an ordinary third-order or fourth order low pass filter, for example, having a Chbeyshev response (Schaumann et. al., supra) would be adequate for filter 40. Compensation for roll-off due to complex impedance termination can be accomplished by modifying the pass band response of the low-pass filter, or by including in the receive filter a lead-lag response having the same form as Equation 2, supra, but with different parameter values In summary, the terminating impedance shaping function for the driver 30 is the combined response of filter networks 36 and 38 (equal to the product $H_1$, $H_2$) while the net receiving path shaping function is the combined response of filter network 36 and 40 (equal to the product $H_1$, $H_3$). Clearly, FIG. 3A can lead to circuit implementations that are simpler and contain fewer components than are shown in the prior art. Consider handling of metering-tone signals as an example. A second order filter which provides a notch response, as shown in FIG. 2B, is needed as part of the impedance shaping response to achieve the impedance level required at the metering-tone frequencies in certain countries. This notch filter can provide a significant portion of the attenuation needed in the receive path at the metering-tone frequency. Typically, a notch filter implemented as a continuous time active filter requiring two operational amplifiers and several resistors and capacitors. In FIG. 3A, these components are included once in the common network 36; the residual network 38 requires a single operational amplifier to meet voice band impedance requirements while the residual network 40 is a filter with two operational amplifiers to provide additional rejection of metering-tone signals and rejection of other wanted signals above the voice band. Implemented as a simply as possible using the prior art configuration of FIG. 1, the impedance shaping network for the transfer impedance will be as complicated as filter networks 36 and 38 combined requiring three operational amplifiers while the receive filter 39 will be at least as complicated as 36 and 38 requiring four operational amplifiers. Thus, the prior art implementation requires 50 percent more circuitry than that shown in FIG. 3A.

The partitioning of the filter networks 36 as a cascade of subnetworks each addressing the requirements of a particular frequency band, simplifies the process of ensuring that the feedback load loop is stable. Any modifications to the overall transfer function H resulting from the initial synthesis procedure, for example, the product of (H1·H2) must be made to guarantee stability can be considered with respect to the individual sub-network responses independently. Accordingly, tradeoffs can be made between meeting impedance requirements and guaranteeing stability in an efficient and intelligent manner.

Figure 4:
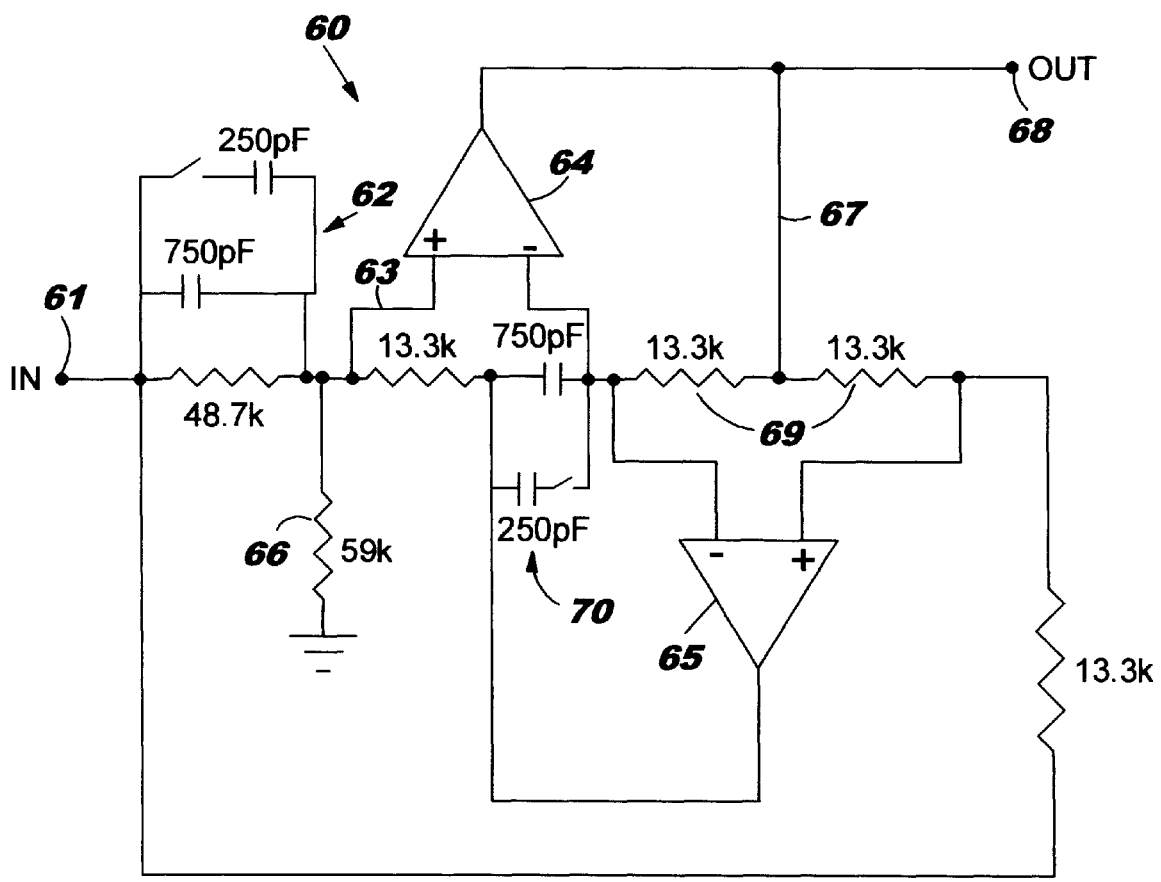
FIG. 4 is a circuit diagram of a programmable filter network included in FIG. 3A for reconfiguring a transfer impedance of the networks.

The cascaded sub-filter networks 36, 38 and 40 may be programmable by the inclusion of switches to add or delete capacitance and/or resistance to the filter. In FIG. 4, one implementation of a filter 60, programmable as an H2 notch filter, includes an input circuit 61 coupled through an RC circuit and switch 62 to a plus side 63 of an operational amplifier 64 and through a resistor to a plus side of an operational amplifier 65. The side 63 is also connected to a reference potential or ground through a resistor 66. The output of the amplifier 64 is connected to an output terminal 68 and to a feedback loop 67 including the operational amplifier 65. The loop 67 is connected through like resistors 69 to plus and minus sides of the amplifier 65, the output of which is provided to the plus and minus sides of the amplifier 64 through an RC circuit and switch 70.

The filter 60 can be programmed by simply switching two capacitors. With the switches in the RC circuits closed in the RC circuits 62 and 70, the filter 60 has a center frequency of 12 kHz; with the switches open, the filter has a center frequency of 16 kHz. The other characteristics of the notch filter (depth and width of the notch, and transmission away from the notch) are not affected by the switching of these capacitors. Additionally, the characteristics of the overall synthesized impedance and voice band, which is determined by the network (H2×H1), is not affected by this programming. Of course, the switches in the RC circuits 62 and 70 can be implemented in a variety of devices. For example, they may be solid state and need not be physical switch contacts.

The filter 60 meets the impedance requirements for the metering-tone band in Switzerland. Such metering-tone band is centered at 12 kHz. In Germany, a metering-tone is used with its band is centered at 16 kHz. However, the impedance requirements of Germany in the voice band (up to 4 kHz.) is essentially the same as that for Switzerland. With the transconductance feedback partitioned into two networks, one controlling the shaping of the synthesized impedance in the voice band and the other controlling the shaping of the synthesized impedance in a metering-tone band, the latter can be programmed to a notch centered at either the Switzerland metering-tone frequency of 12 kHz. or the Germany metering-tone frequency of 16 kHz.

Figure 5:
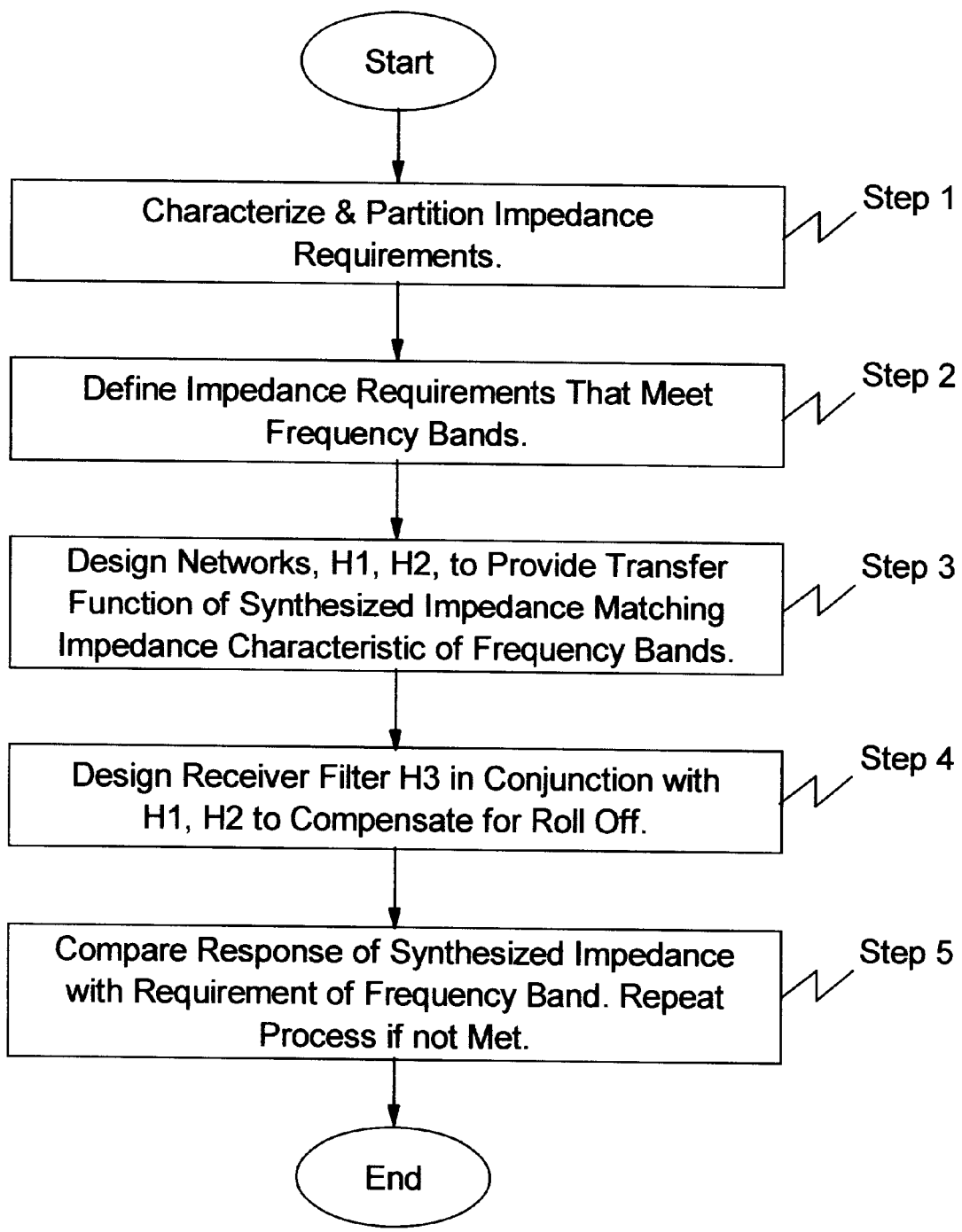
FIG. 5 is a flow diagram for a design method for the circuit of FIG. 3A in accordance with the principles of the present invention.

In FIG. 5, a design method for determining and shaping the terminating impedance requirements for the different frequency bands and the receive path response to prevent roll-of comprises the following steps:

Step 1: Characterize and partition the impedance requirements vs. frequency using Equations 1, 2 and 3 described above. Step 1 identifies the frequency bands within which separate approximations will be carried out. In some cases, the identification is straight-forward given the requirement; the Switzerland impedance requirement used as an example falls in this category. In other cases, the identification may not be so obvious and an iterative, trial-and-error procedure may be needed (see Step 4 below).

Step 2: For each frequency band in the partition resulting from step 1, define an impedance characteristic that meets the specified impedance requirement within the given frequency band, and is constant vs. frequency outside the given frequency band. The overall impedance characteristic will be the product of these individual impedance characteristics, and so the constants are chosen such that the overall characteristic meets the specified impedance requirements across all the bands. Note: In the Switzerland example, there are two bands identified, with a relatively wide frequency range between them in which no requirement is specified. In addition, the "metering tone" band is very narrow and the requirement specified therein is for a minimum impedance level. It is known that a response can be created that has a peak exceeding some minimum value in a narrow frequency band while being approximately constant at unity outside this frequency band. Thus, for this example, the constant value of the "out of band" response of the metering-tone impedance characteristic can be taken to be unity, and the "out of band" constant response of the voice band impedance characteristic can be taken to be equal to the value of the characteristic at the upper end of the voice band (about 4 kHz).

Step 3: For each frequency band in the partition, a network is designed whose transfer function approximates the inverse of the impedance characteristic within the given band, and the appropriate constant outside the band. The networks are connected in cascade (in FIG. 3A, two networks $H_1$ and $H_2$, because have two bands of interest. However, in general, there may be more than two networks if there are more than two bands, and the overall synthesized impedance characteristic is computed as $(1/G_m * H_1 * H_2 * \ldots * H_N)$ where N is the number of bands and thus of networks. The constant scale factors associated with each network (which are associated with the out-of-band constant value for the given network) may be adjusted, together with the constant transconductance value $G_m$ of the transconductance amplifier.

Step 4: Determine if the response of the sub-networks H1 and H2 are useful in shaping the frequency response of the receive path and include such response in the design of the filter 40 using Equations 2 and 3 to compensate for roll-of. If the sub-networks are useful, they are connected in tamden between the output of the transconductance amplifier and the receive signal connection 39 and thus shared with the receive path. The remaining sub-networks are connected between the connection point 39 and the summing node 42.

Step 5: Compare the overall response of the synthesized impedance characteristic with the requirement. If the requirement is met, the design process is completed. If not, a different partition of the required characteristic vs. frequency is attempted and the process returns to step 2, or a different assignment of out-of-band constant values can be taken given the original partition and the process returns to step 3.

The process is independent of the technology used to implement the networks H1, H2 and H3 (and additional filters, if appropriate). The notch filter implementation is a continuous-time analog active filter. Implementations in switched-capacitor technology are available, and may be preferable in some cases because they are easily programmed (the switches shown in the notch filter example would be inherently included in a switched-capacitor version). Implementations are also available in digital filter technology using the principles of the present invention.

While the invention has been shown and described in conjunction with a preferred embodiment, various changes may be made therein without departing from the spirit and scope of the invention as defined in the appended claims, in which:

We claim:
1. Apparatus comprising:
   a communication circuit;
   a transconductance amplifier including an input terminal and an output terminal coupled to the communication circuit;
   a feedback loop coupling the output and the input terminals of the amplifier;
   a signal source connected to the input terminal; and
   a filter network coupled to the feedback loop providing simultaneous and combined shaping of synthesized impedances matching different frequency bands and a receive response path to prevent frequency roll-off on different connecting communication channels;
   said filter network having circuitry which matches the impedance requirement of metering tones in a first frequency range while matching the impedance requirement of voice signals in a second frequency range.

2. The reconfigurable communication interface of claim 1 wherein the filter network comprises a plurality of cascaded filter networks in the feedback loop.

3. The reconfigurable communication interface of claim 1 wherein the filter network comprises a plurality of cascaded filter networks in the feedback loop and a receive filter circuit connected to the loop.

4. The reconfigurable communication interface of claim 1 further comprising:
   a) means in the filter network for coupling a receive filter to cascaded filter networks in the loop whereby the receive filter in combination with a cascaded filter in the loop combine to prevent frequency roll-off in a receive circuit.

5. The reconfigurable interface of claim 1 wherein the filter circuit is partitioned into sub-filter networks, each network matching the impedance requirement of a frequency band without affecting the impedance requirement of the other network.

6. The reconfigurable communication interface of claim 1 further comprising:
   a) means for connecting the sub-filter networks wherein the transfer function for the feedback loop is the product of the transfer functions of the sub-filter networks.

7. The reconfigurable communication interface of claim 1 further comprising:
   a) means for programming the filter network to provide terminating impedances matching the impedance requirements of the different frequency bands on different connecting telephone lines and a receive circuit not subject to frequency roll-off.

8. The reconfigurable communication interface of claim 1 wherein the filter network comprises a plurality of cascaded filter networks in the feedback loop and a receive filter connected to the midpoint of the cascaded filter networks.

9. A method comprising the steps of:
   partitioning into a plurality of sub-networks a filter network included in a feedback loop which is connected in a telephone system which also has a transconductance amplifier and a telephone line connected together with the filter network; and
   configuring each sub-network to have an impedance matching a different frequency band and a receive signal response which is not subject to frequency roll-off, the filter network having sub-network circuitry which matches the impedance requirement of metering tones in a first frequency range while matching the impedance requirement of voice signals in a second frequency range.

10. The method of claim 9 further comprising the step of:
a) connecting the sub-filters in cascade.

11. The method of claim 9 further comprising the step of:
a) reconfiguring the filter network to provide matching terminating impedances for different frequency bands on different telephone lines, and a frequency response in a receive circuit not subject to frequency roll-off.

12. The method of claim 9 further comprising the step of:
a) programming the filter network to provide matching terminating impedances for different frequency bands on different telephone lines, and a receive circuit not subject to frequency roll-off.

13. The method of claim 9 further comprising the step of
a) providing a notch response for the filter network.

14. The method of claim 9 wherein the filter network provides a synthesized terminating impedance which is the product of transfer functions of a plurality of sub-filters.

15. The method of claim 14 wherein a sub-filter is defined by the following equation:

$$H_1(s) = H_{10} \frac{\left[1+\left(\frac{s}{\omega_z}\right)\right]}{\left[1+\left(\frac{s}{\omega_p}\right)\right]}$$

where:
$H_1(s)$=the LaPlace Transform $H_1$ defining the terminating impedance for the voice frequency band;
$H_{10}$=a constant scale factor of the transfer function;
$\omega_p$=pole frequency for the network; and
$\omega_z$=zero frequency for the filter network.

16. The method of claim 14 wherein a sub-filter is defined by the flowing equation:

$$H_2(s) = H_{20} \frac{1+\left(\frac{1}{Q_U}\right)\left(\frac{s}{\omega_0}\right)+\left(\frac{s}{\omega_0}\right)^2}{1+\left(\frac{1}{Q_L}\right)\left(\frac{s}{\omega_0}\right)+\left(\frac{s}{\omega_0}\right)^2}$$

where:
$H_{20}$=a constant scale factor of the notch transfer function;
$\omega_0$=the center frequency of the notch response for the metering tone frequency;
$Q_U$=unloaded Q of the notch, which is related to the ratio of the maximum energy stored to the energy lost in the filter $H_2$; and
$Q_L$=loaded Q of the notch, which is related to the ratio of the maximum energy stored to the energy lost in the filter $H_2$.

17. A design method for a terminating impedance in a transconductance amplifier feedback loop, the terminating impedance matching different frequency bands on a telephone line, comprising the steps of:
a) characterizing and partitioning the terminating impedance requirements for each frequency band on the telephone line;
b) for each frequency band in the partition resulting from step a, define an impedance characteristic that meets a specified impedance requirement within a given frequency band, and is constant vs. frequency outside the given frequency band;
c) choosing the constants such that the overall impedance characteristic meets the specified impedance requirements across all the frequency bands;
d) for each frequency band in the partition, design one or more sub-networks whose transfer function approximates the inverse of the impedance characteristic within the given band, and the appropriate constant outside the band;
e) comparing the overall response of the synthesized impedance characteristic with the requirement, if the requirement is met, the design process is completed; otherwise steps a–d are repeated using a different partition of the required characteristic vs. frequency or a different assignment of out-of-band constant values are selected given the original partition of step a, after which the process returns to step c; and
f) verifying the stability of the transconductance feedback loop taking into account the open-loop behavior of the transconductance amplifier; if the stability margin is inadequate, the transfer functions of one or more of the sub-networks is modified such that the impedance requirements are met and the stability margin is adequate.

* * * * *